Aug. 12, 1930.    R. I. MUSSELLWHITE    1,773,006
CANOPY FOR MOTOR CARS
Filed Aug. 29, 1928    2 Sheets-Sheet 1

INVENTOR
R. I. Mussellwhite.
BY
William C. Luton
ATTORNEY

Aug. 12, 1930.  R. I. MUSSELLWHITE  1,773,006
CANOPY FOR MOTOR CARS
Filed Aug. 29, 1928   2 Sheets-Sheet 2

INVENTOR
R. I. Mussellwhite
BY
William C. Linton.
ATTORNEY

Patented Aug. 12, 1930

1,773,006

UNITED STATES PATENT OFFICE

RICHARD INGLETON MUSSELLWHITE, OF LONDON, ENGLAND

CANOPY FOR MOTOR CARS

Application filed August 29, 1928, Serial No. 302,865, and in Great Britain October 17, 1927.

This invention relates to canopies for the driving seats of motor cars and it refers more especially to those types of body known as cabriolet and coupé-de-ville, wherein while the passengers' portion of the body is provided with a covering which may or may not be fixed, the driving seats are normally unsheltered but may be protected by an extensible or folding roof portion housed invisibly, when not in use, in a compartment above said seats.

In the arrangement usually adopted for this driving seat protection, a leather or fabric extension or covering is carried by a collapsible frame embodying two side members hinged so as to fold or collapse inwardly of the vehicle and a front transverse rail which either folds back with said side members or is rolled up inside the leather or fabric extension which must be detached from the side members before they can be stowed away.

The object of the invention is to avoid the necessity for detaching the leather or fabric extension from the side rails and also to avoid the additional and independent operation required to dispose of the front rail. It also has for its object to facilitate and expedite the manipulation of the driving seat canopy as well as to render the structure more rigid when in use.

According to the invention the leather or fabric extension or covering is permanently attached along its sides to the two hinged side members of its frame and the front transverse rail is divided into two halves each of which is articulated to one of said side members with which said halves co-operate, when extended, to engage the side uprights of the windscreen, the whole being retained in extended position by a single central fastening device and the front edge of the covering being secured by clamping it along the transverse front rail.

The usual or any suitable recess is formed in the vehicle body to accommodate the covering and its collapsible framework when folded back and not in use.

Each side member is hinged at its rear or inner end to the body of the vehicle and to its forward or outer end is hinged one half of the divided front transverse rail, co-acting blades or plates being borne by the adjacent ends of the side and forward rails, which blades or plates are adapted to engage grooved pins or studs upstanding from the two side pillars of the windscreen when said hinged parts are fully extended. Or, any other desired means may be employed for interlocking these parts to secure the requisite support and rigidity.

The aforesaid front transverse rail may be provided with a flanged plate adapted, when the frame is extended, to engage a corresponding plate carried by the windscreen centrally of which there may be located a screw, turnbutton or equivalent fastening contrivance serving to force the former plate against the latter, the abutting ends of the divided front transverse rail being arranged so as to overlap and thus become locked when said plates are forced together.

As has already been stated, the leather or fabric covering is permanently attached at its rear end to the body of the vehicle and at its two sides to the two aforesaid hinged side members, while its front edge is free or unattached and is formed with a lip, bead or piping adapted to be engaged by the flanged plate pivoted behind the front transverse rail and to be swept by it into a groove formed in a bar attached to said rail or otherwise suitably arranged; the frame so functioning that the positioning of the front rail automatically drops the beaded front edge of the covering adjacent said groove and the swinging forward of the flanged plate wipes the front edge of the covering into the groove where it becomes secured in a weatherproof manner when the aforesaid screw, turnbutton or the like is tightened up.

The aforesaid framework may if desired be controlled by springs in order to facilitate its manipulation.

Instead of mounting the aforesaid flanged plate on the front transverse rail said plate may be formed on or carried by the windscreen itself and functions, as before, to nip the free front edge of the canopy when the hinged members of said transverse front rail are extended into position along the top of the windscreen.

One constructional embodiment of the invention is illustrated by way of example in the accompanying drawings, in which.

Figure 1:
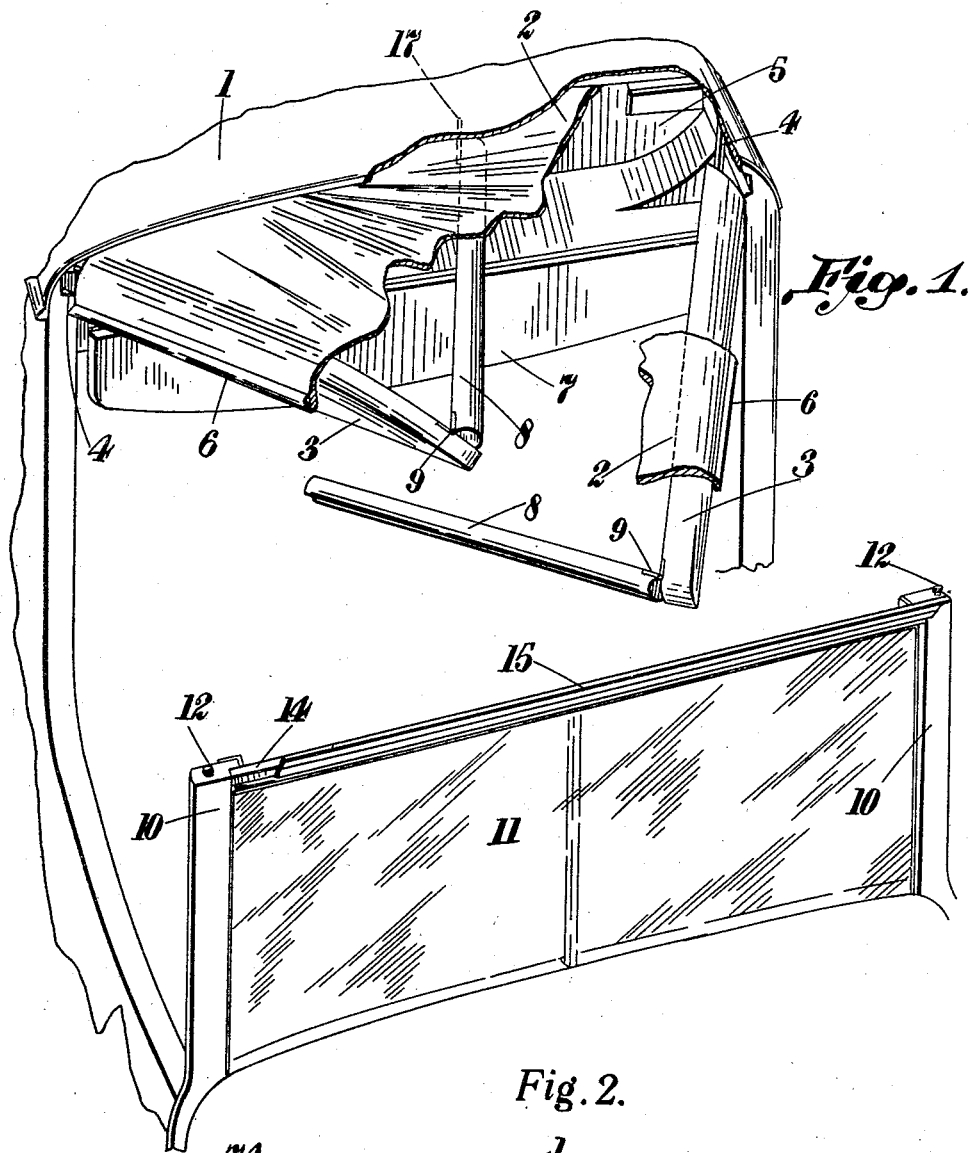
Figure 1 is a front perspective view of a portion of a coupé-de-ville body showing part of the head and the windscreen, and also showing the collapsible framework of the canopy partially extended and some of the canopy as broken away for the sake of clearness.

1 is the permanent leather fabric, or other covering of the head of the vehicle, and 2 is the leather, fabric or other collapsible canopy which is properly shaped and adapted to be extended over the driving or front seats when protection for them is required.

3, 3, are the two side members of the canopy frame which are mounted on narrow elongated hinge plates 4, 4, within a housing 5 and along the sides of which members 3 the material composing the canopy 2 is permanently attached by a bead 6 or otherwise suitably.

The lower face of each side member 3 is provided with a felt lined grooved 3', (see Fig. 3) for receiving the upper edges of the vertical movable windows 11' of the side doors leading to the front compartment of the vehicle body in which the driving or front seats are arranged.

Figure 2:
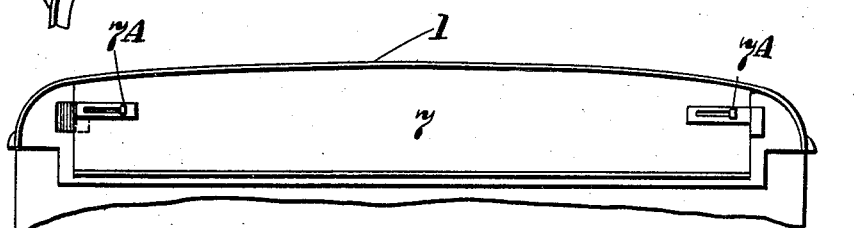
Figure 2 is a detail front view of the upper part of the head, showing the door of the canopy housing closed.

The housing 5 is provided with a hinged door 7 which may be closed and fastened suitably such as by bolts 7A (Figure 2) so as to conceal the canopy 2 and its frame when all parts are folded away or collapsed into the housing, and said door is also capable of being closed so as to mask the housing when the canopy and its frame are in the extended position.

Figure 3:
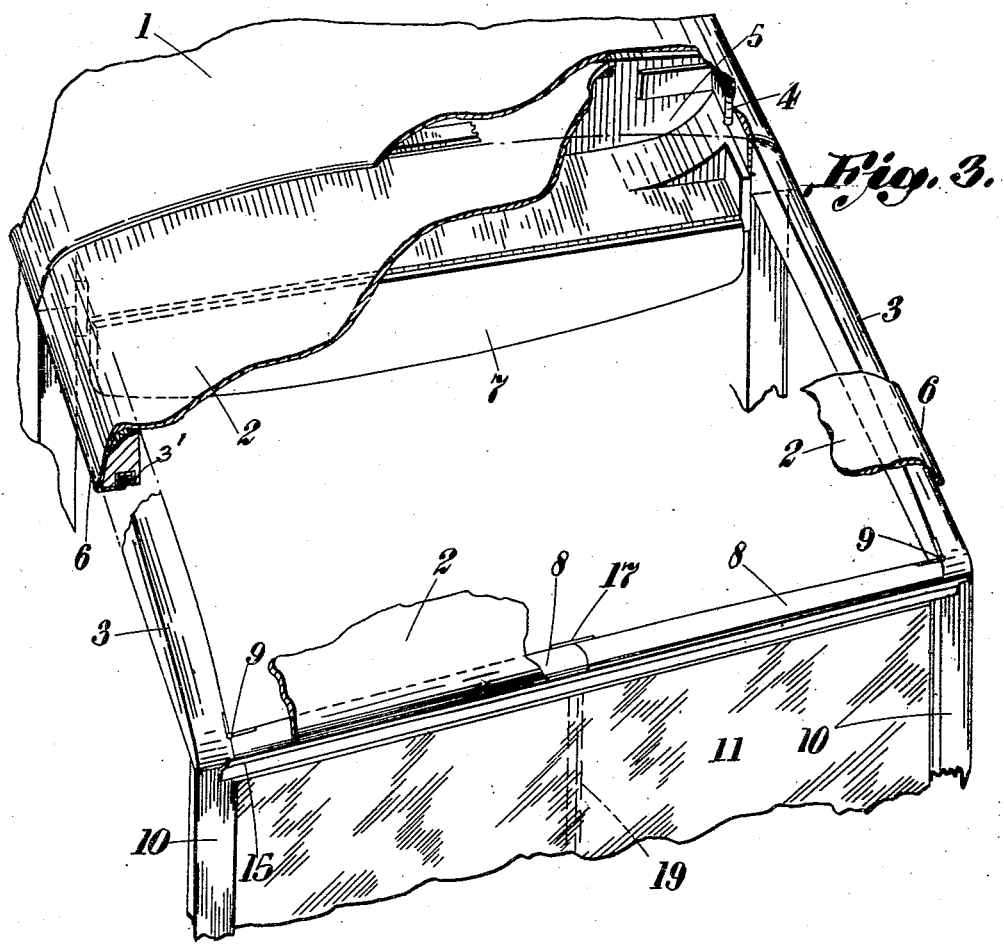
Figure 3 is a perspective plan view somewhat similar to Figure 1 and showing the parts extended into position, but portions of the canopy broken away and the door of its housing open instead of being closed as it would be in practice.

8, 8, are the two halves of the front transverse rail of the canopy frame, each of which is articulated at 9 to the front end of its corresponding side member 3 with which said halves 8 co-operate, when extended as shown in Figure 3, to engage the side uprights or pillars 10, 10, of the windscreen 11; co-acting horizontal blades or plates (not shown) borne by the undersides of the adjacent ends of the side rails 3 and the halves of the front rail 8 being provided in order to engage grooved pins or studs 12, 12, upstanding from said pillars 10, as will be readily understood.

Figure 4:
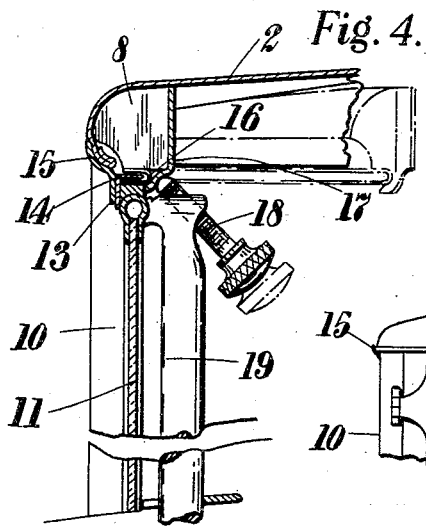
Figure 4 is a sectional detail view illustrating the securing means for the canopy when extended.

Secured to the top member 13 of the windscreen frame, or to its equivalent are an angle-plate 14 and a curved flanged plate 15, see Figure 4.

The horizontal limb of said angle-plate 14 is raised slightly above said top member 13 of the windscreen frame inwardly of which it projects and is adapted to be engaged by a divided U-section plate 16, secured along the underside of each half of the transverse front rail 8, when said latter rail is in extended position; and attached to one half of the front rail 8, in such manner as to overlap the contiguous ends of both halves of said front rail when extended, is a metal tongue 17 against the lower end of which is adapted to be forced the end of a setscrew 18 borne by the upper end of a pillar 19 disposed centrally of the windscreen 11.

Normally, the canopy 2 is folded away with the parts 8, 8, collapsed against the side rails 3, 3, into the housing 5 which is closed by the door 7 so as to appear (as in Figure 2) an integral part of the head of the body when the canopy is not in use. When the protection afforded by the canopy is required, the door 7 is pulled angularly downwards, side members 3, 3, are pulled angularly outwards, and the two halves 8, 8, are pushed angularly forwards, until the forward extremities of side members 3, 3, and the pivoted extremities of member 8, 8, engage the studs 12, 12, on the posts 10, 10.

This outward and forward movement of the components of the canopy frame stretches the shaped leather or fabric canopy 2 into position over the front seats and the final pressure imparted to the two halves 8, 8, of the transverse front rail in order to bring them into alignment automatically sweeps the hemmed or beaded free front edge of the canopy 2 into contact with the curved flanged plate 15 along the top front edge of the windscreen 11 against which plate 15 the edge of the canopy is securely nipped by tightening up the setscrew 18; the U-section plate 16 combining with the angle plate 14 to produce a weathertight closure along the upper edge of the windscreen.

Figure 5:
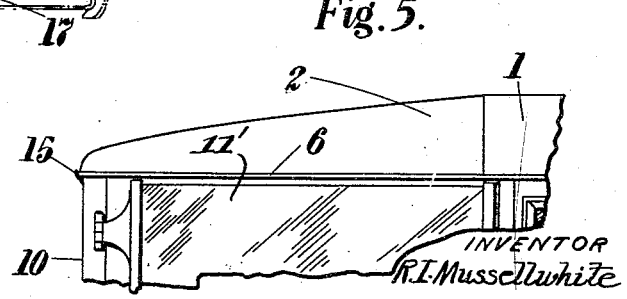
Figure 5 is a detail side view of the canopy when extended.

The canopy 2 is so shaped that when it becomes stretched by the operation of extending its frame and nipping its free front edge, all creases or folds are eliminated and it has the appearance of a perfect continuation of the main head covering 1 as shown in Figure 5; the rear edge of the canopy being permanently secured to the top inner edge of the housing 5 in any suitable weathertight manner and protruding from said housing in close contact with the forward edge of the head covering 1.

If desired, the framework 3, 3, 8, 8, may be fitted with spring-controlled hinges or other appropriate means for facilitating the extension of the parts in a manner analogous to the spring-actuated raising means already well known for the purpose of assisting the erection of coupé, cabriolet and other similar heads.

What I claim is:—

1. A collapsible top extension for vehicle tops comprising in combination a windshield frame spaced from the vehicle top, a flexible covering extending from the vehicle top to the windshield frame, a foldable frame for said covering including side members hingedly connected to the vehicle top and engaging the opposite sides of the flexible cover, a pair of abutting end members one for each side member and hingedly connected thereto, said abutting end members being adapted to receive thereover the free end of the covering, and means for forcing said abutting end members against the windshield frame for clampingly retaining the free end of the cover between said end members and windshield frame.

2. A collapsible top extension for vehicle tops comprising in combination a windshield frame spaced from the vehicle top, a flexible covering extending from the vehicle top to the windshield frame, a foldable frame for the covering, including rigid side members hingedly connected to the vehicle top and fixedly engaging the opposite sides of the flexible cover, a pair of abutting end members one for each side member and hingedly connected thereto, said abutting end members supported adjacent the windshield frame and adapted to receive thereover the free end of the covering, means carried by one of said end members and extended to have engagement with the other end member, and means contacting with said last mentioned means for forcing said abutting end members against the windshield frame to clampingly retain the free end of the covering between said end members and windshield frame.

3. A collapsible top extension for vehicle tops comprising in combination a windshield frame spaced from the vehicle top, a flexible covering extending from the vehicle top to the windshield frame, a foldable frame for the covering, including rigid side members hingedly connected to the vehicle top and engaging the opposite sides of the flexible cover, a pair of abutting end members one for each side member and hingedly connected thereto, said abutting end members being supported adjacent the windshield frame and adapted to receive thereover the free end of the covering, a plate carried by one of said end members and extended to have engagement with the other end member, and a set screw mounted upon a portion of the windshield frame and contacting with said plate for forcing the abutting end members against the windshield frame to clampingly retain the free end of the covering between said end members and windshield frame.

4. The combination with a vehicle top and a windshield frame provided with a flange plate secured to portions thereof, of a collapsible top extension for the vehicle top, said top extension comprising a flexible covering having one end fixed to the vehicle top, side members engaging the opposite sides of the flexible covering and hingedly connected to the vehicle top, an end member for each side member hingedly connected and foldable in parallel relation thereto, said end members capable of being extended at times, in parallel relation with the windshield frame, adjacent the flange plate thereof, said end members adapted to receive thereover the free end of the flexible covering, and means for forcing said end members when in extended position, against the windshield frame to clampingly retain said free end of the covering between the end members and flange plate of the windshield.

In testimony whereof he affixes his signature.

RICHARD INGLETON MUSSELLWHITE.